Sept. 24, 1963 C. R. SMALLMAN 3,105,156

CRYOTRON SWITCHING DEVICE

Filed Feb. 4, 1957

Inventor
Carl Russell Smallman
by Roberts, Cushman & Grover
Attys

United States Patent Office 3,105,156

Patented Sept. 24, 1963

3,105,156
CRYOTRON SWITCHING DEVICE

Carl Russell Smallman, Lexington, Mass., assignor to Arthur D. Little, Inc., Cambridge, Mass., a corporation of Massachusetts Filed Feb. 4, 1957, Ser. No. 637,945
12 Claims. (Cl. 307—88.5)

This invention relates to a device for switching or controlling electrical current and more particularly to a circuit component utilizing a body of superconductive material.

Various superconductive materials are known which are capable of a change of state from one of finite electrical resistance to one of zero resistance. For example, a body of lead cooled to 7.2 degrees Kelvin suddenly drops to zero resistance. The temperature at which superconductive materials undergo such transition is dependent on the magnetic field about the material. The critical temperature of 7.2° K. for lead supposes a zero magnetic field. As the field increases toward approximately 800 oersteds the transition temperature drops toward zero, and at intermediate temperatures there is a field which, if exceeded, will cause the lead body to change from superconducting state to a state of finite resistance. Thus for any given temperature below critical temperature there is a predetermined value of magnetic field above which lead undergoes transition from the superconducting state, and the transition between superconduction and finite resistance, can be effected by varying the magnetic field respectively below and above the predetermined value. Above the critical temperature no reduction of field can restore superconduction. Herein the term superconductive is used to designate the capability of the body to change between the above-mentioned states, while superconducting or superconduction designates the zero resistance state.

The possibility of transferring a superconductive body between superconducting and resistance states by varying the field around the body above and below a predetermined value is utilized in electrical circuit element as follows: Around a short body of superconductive wire, such as tantalum (Ta) is wound a coil of wire, such as niobium. The element so formed may be held below the critical temperature of tantalum (4.4° K.) by immersion in liquid helium at 4.2° K. In the absence of a magnetic field, a primary current applied to the tantalum body will encounter zero resistance in flowing through the superconducting tantalum body. If a control current is applied to the niobium coil sufficient to produce a magnetic field of approximately 100 oersteds, the tantalum body will change partially or wholly to resistance state and present a finite resistance to the primary current flowing therethrough. In changing to resistive state the tantalum body acts as a valve or switch component. For example, if the primary current has an alternate zero resistance path, the finite resistance, although small, will in effect switch the primary current to the alternate path.

In one useful example, when two like components are connected in parallel with a current source, and the control coil of one body is connected in series with the other, and vice versa, the two components form a flip-flop circuit wherein the tendency of one body to change to resistive state, is reinforced by the tendency of the other body to remain superconducting. However, such a circuit requires in addition, signal input means for influencing the states of the respective flip-flop components, and usually also signal output means for detecting the state of the respective bodies.

One object of the present invention is to provide a superconductive circuit component which simplifies the means by which input signals or output signals are applied or detected.

According to the invention a circuit component comprises a superconductive body responsive to a predetermined field to change between a state of superconduction and a state of finite resistance, control means for applying a magnetic field to said body thereby to influence said change of state, and superconductive means disposed in the field of said control means.

While a control coil has been previously mentioned other forms of magnetic control means are useful in the production of a control field. The control means need not supply the whole field applied to the body so long as it influences the transition between states. The current conductor may be superconducting means in the field of the control means, or may produce its own field common to the body or control means, as will be apparent from the illustrative embodiments shown in the accompanying drawings in which.

Figure 1:
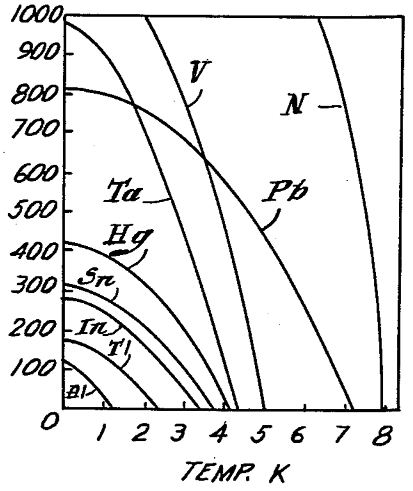
FIG. 1 is a plot of transition temperature against magnetic field applied to various superconducting bodies.

As shown in FIG. 1 various elements are capable of superconduction, depending upon the temperature and magnetic field of their environment. In this figure are shown the transition curves of aluminum (Al), thallium (Tl), indium (In), tin (Sn), mercury (Hg), tantalum (Ta), vanadium (V), lead (Pb) and niobium (Nb). For each of these elements the curve is a plot of the transition temperature as a function of the applied magnetic field. Below the curve the element is superconducting, and above the curve the element has a finite resistance usually less than the resistance at room temperature.

Figure 2:
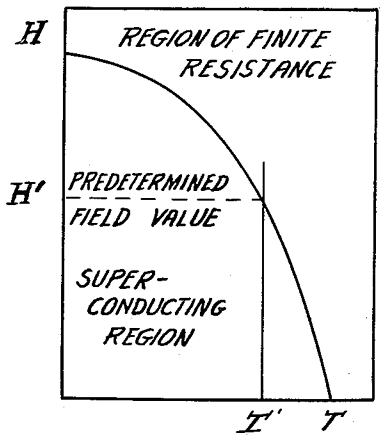
FIG. 2 is a similar plot illustrating a predetermined field value at which a superconductive body changes between superconducting and resistive state.

As shown in FIG. 2 the transition curve is the boundary between the superconducting region and finite resistance region of a given element. For a given temperature environment T′ there is a predetermined magnetic field value H′ at the transition point or zone. Increasing the field above the predetermined value H′ destroys superconduction, while reducing the field below the predetermined value establishes superconduction.

Figure 3:
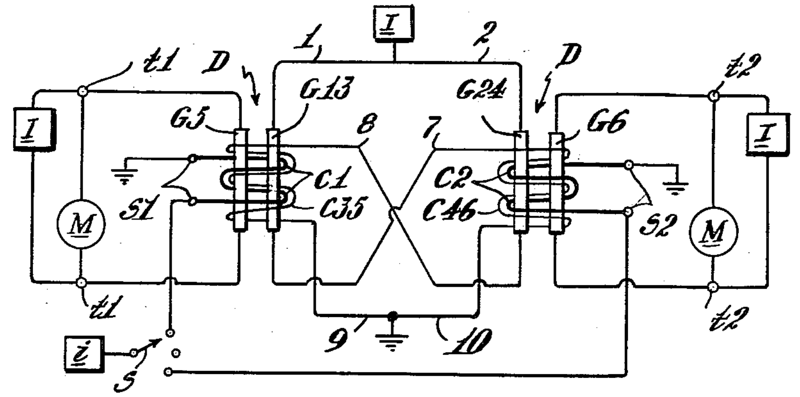
FIG. 3 is a schematic diagram of a flip-flop circuit.

The flip-flop or bistable circuit shown in FIG. 3 forms two paths for current flowing from a source I to a current collection point which for simplicity is shown as a ground return to the current source I. One path from the source I may be traced through a connection 1, a superconducting body G13, thence through a connection 7 and a control winding C46 to the ground return. Similarly the second path is traced through parts 2, G24, 8, C35 and 9 to ground.

Each of the bodies G13 and G24 comprises a gate of superconductive metal, such as tantalum, held below its critical temperature by immersion in liquid helium. Gate G13 and coil C46 are connected in series such that current through gate G13 flows through the control coil C46 of gate G24; and conversely gate G24 and coil C35 being in series, current through gate G24 flows through control coil 35 of gate G13.

Except under theoretical conditions, the current through the gates G13 and G24 will tend to be more and more unbalanced until one of the gates conducts all the current. For example, if superconducting gate G13 carries more current, that greater current flowing also through control coil C46 will apply a magnetic field which drives gate G24 toward resistive state with a regenerative action. When gate G24 reaches resistive state, current from the source I, having the choice of a zero resistance path through G13 and a finite resistance path through gate G24 will flow entirely through gate G13 and control coil C46, thereby establishing a magnetic field which stably holds the gate G24 in resistive state until circuit conditions are changed.

The stably unbalanced condition of the flip-flop circuit may be reversed by supplying a current signal to the input or set terminals *s1* or *s2* of control coils C1 and C2 wound around gates G13 and G24 respectively. Each of the input terminals *s1* and *s2* may be connected through switching means S to a current source *i*. While the switching means is shown schematically as a simple contactor, various other means may be used to apply a signal to the set terminals.

Assuming gate G13 to be superconducting, if a current signal is applied to set terminals *s1* and coil C1, superconduction in gate G13 will be destroyed by the resulting magnetic field and its finite resistance will appear in the previously non-resistive path therethrough. The above described regenerative effect will then tend to restore superconduction in gate G24 until the circuit is stably unbalanced with all current flowing through the gate G24. The signal at terminals *s1* may then be removed without changing the unbalance. Similarly a signal at terminals *s2* will establish current through the opposite gate G13.

The alternative conditions of unbalance, are detected by output gates G5 and G6 embraced within coils C35 and C46 respectively. If current is established through either of gates G13 or G24, it passes through one or the other of the control coils C35 and C46 producing a magnetic field within the coil as described above. Accordingly one of the corresponding output gates G5 or G6 will be caused to have a finite resistance. For example, if gate G13 is in resistive state, the output gate G5 embraced by the field of transfer coil C35 will also be held in resistive state. A current source I connected in parallel with a meter M and through terminals *t1* and the output gate G5 will cause the meter to indicate the resistive state by a given deflection. With a like detecting circuit connected to the output terminals *t2* of output gate G6, the state of unbalance of the flip-flop circuit may be determined with reference to the meters M, only one of which will indicate resistance at a time.

Figure 4:
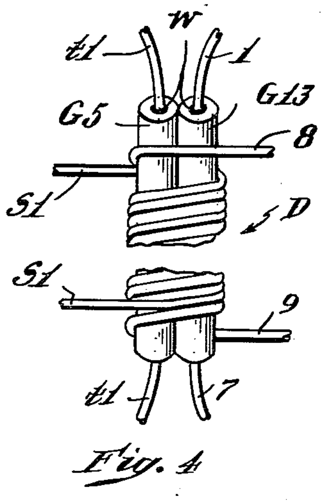
FIG. 4 is an isometric view of a circuit component shown schematically in FIG. 3.

As shown in FIG. 4, each side of the bi-stable circuit of FIG. 3 may be formed as a single component D. By way of example, the left hand component may comprise two gate wires G5 and G13 each approximately 0.009 inch in diameter and one half inch long. Preferably the gate wires are tantalum having a critical temperature (i.e. maximum superconducting temperature in zero magnetic field) of about 4.4° K., 0.2° K. above the boiling point of liquid helium. The individual wires are coated with a thin (0.0005″) layer of suitable insulation such as enamel, and have leads or terminals 1, 7, and *t*1, preferably niobium, connected to their ends by welds *w*. Wound around the two gates are approximately 150 parallel turns each of two wires C1 and C35. The wires are preferably niobium, 0.003 inch in diameter, coated with a suitable insulation.

Tantalum gates are niobium coils and lead connections are described since tantalum is superconducting just below the boiling point of liquid helium and can be changed to resistive state by a small magnetic field. On the other hand niobium's transition curve lies wholly outside the superconducting region of tantalum, and hence the niobium coils and lead connections will have zero resistance under field values adjacent the transition curve of tantalum. From this example it will be apparent that various elements are suitable as superconductive gates and that, if desired, other elements having higher transition curves may be used as coils and connections.

While both input and control coils are shown wound on the regenerative and output gates, it should be understood that the input signal may be applied other than by a coil so wound, while still retaining the advantage of embracing both the regenerative and output gates within the same control field. If two controls are used they need not be wound parallel, but may be wound separately or may be conductors in other than coiled form. Further, it should be understood that more than two coils may be used as inputs or controls for each component D, and that more than two gate bodies may be embraced within the field of the coils. Thus the example of FIGS. 3 and 4 embraces various combinations and equivalents within the scope of the appended claims.

I claim:

1. An electrical circuit component comprising a superconductive body responsive to a predetermined magnetic field to change between a state of superconduction and a state of finite resistance, control means for applying a magnetic field to said body thereby to influence said change of state, and superconductive means disposed in the field of said control means and influenced to change state concomitantly with said body, said control means being disposed such that the field affecting said body and said superconductive means is substantially continuous.

2. An electrical circuit component comprising a superconductive body responsive to a predetermined magnetic field to change between a state of superconduction and a state of finite resistance, control means disposed to apply a magnetic field to said body to effect said change of state, and a second superconductive body disposed in the field of said control means for indicating the state of the first said gate body, said control means being disposed such that the field affecting the respective bodies is substantially continuous.

3. An electrical circuit component comprising a plurality of superconductive bodies responsive to a predetermined magnetic field to change between a state of superconduction and a state of finite resistance, and control means for applying a magnetic field to said bodies, one of said bodies comprising a gate and another of said bodies comprising output means, and said control means comprising input means applying a magnetic field to both said gate and output means, said control being disposed such that the field affecting the respective bodies is substantially continuous.

4. An electrical circuit component comprising a plurality of superconductive bodies responsive to a predetermined magnetic field to change between a state of superconduction and a state of finite resistance, and a plurality of control means respectively for applying a magnetic field to said bodies, one of said bodies comprising a gate and another of said bodies comprising output means, and one of said control means comprising input means applying a magnetic field to both said gate and output means, said control means being disposed such that the field affecting the respective bodies is substantially continuous.

5. A flip-flop comprising two units, each unit including at least two superconductive bodies responsive to a predetermined magnetic field to change between a state of superconduction and a state of finite resistance, and each unit including control means for applying a magnetic field to both bodies of a unit collectively, current supply means connected to one of the bodies of each unit, one body of each unit being connected to the control means of the other unit, current collecting means connected to the control means of each unit, each of the other bodies of each unit having output terminals, and input means for establishing resistance to current through said one body of one unit and the control means of the other unit, thereby to permit both bodies of said other unit to conduct unresisted current so that no resistance is offered to current between the output terminals of said other unit, the control means of each unit being disposed such that the field affecting its respective bodies is substantially continuous.

6. A flip-flop comprising two units, each unit including at least two superconductive bodies responsive to a predetermined magnetic field to change between a state of superconduction and a state of finite resistance, and each unit including at least two control means respectively for applying a magnetic field to both bodies of a unit collectively, current supply means connected to one of the bodies of each unit, one body of each unit being connected to one of the control means of the other unit, current collecting means connected to said one control means of each unit, each of the other control means of each unit having independent input terminals, and each of the other bodies of each unit having output terminals, whereby a current applied to the input terminals of one unit destroys the superconduction of that unit and establishes resistance to current through the control means of the other unit, thereby to permit both bodies of said other unit to conduct unresisted current so that no resistance is offered to current between the output terminals of said other unit, the control means of each unit being disposed such that the field affecting its respective bodies is substantially continuous.

7. An electrical circuit component adapted to form with a like component a bistable circuit having an input, a transfer and an output function, said component comprising an output gate and a transfer gate, each gate comprising a superconductive body responsive to a predetermined magnetic field to change between a state of superconduction and a state of finite resistance, and a transfer control and an input control, each of said controls comprising a current conductor disposed to apply a magnetic field to both of said gates thereby to influence a change of state in said gates simultaneously, said controls being disposed such that the portions of their fields affecting the gates are substantially continuous.

8. An electrical circuit comprising, two components each including an output gate and a transfer gate, each gate comprising a superconductive body responsive to a predetermined magnetic field to change between a state of superconduction and a state of finite resistance, and a transfer control and an input control, each of said controls comprising a current conductor disposed to apply a magnetic field to both of said gates thereby to influence a change of state in said gates simultaneously, the transfer gate of each component being connected in a series with the transfer control of the other component, and both of said series being connected in parallel with each other, and common current-supply and current-collection connected to said series, whereby a current supplied to the input control of one component causes the transfer gate of said one component to change to a state of finite resistance and divert supply current through the other unit to the transfer control of said one unit thereby to hold both the transfer and output gates of said one unit in a state of finite resistance, the controls of each component being disposed with respect to their respective gates such that the portions of their fields affecting their respective gates are substantially continuous.

9. An electrical gating element comprising two conductors arranged side-by-side, the conductors having critical temperatures and magnetic field transition characteristics between resistive and superconductive states, means for maintaining said conductors at a temperature such that they are superconductive in the absence of a magnetic field, and a control coil surrounding and wound around both of the conductors to establish a magnetic field to destroy superconductivity in both conductors.

10. A gating element as defined in claim 9 in which the control coil is itself of superconducting material.

11. A bistable circuit comprising two transfer conductors and two sensing conductors, all of a material having critical temperature and magnetic field characteristics between superconductive and resistive states, a control coil surrounding one of the transfer conductors and one of the sensing conductors, a second control coil surrounding the other transfer and sensing conductors, means for connecting each transfer conductor with the control coil surrounding the other transfer conductor, and means for selectively establishing current flow in one of the transfer conductors whereby said current will establish a magnetic field to destroy superconductivity in the other transfer conductor and its associated sensing conductor.

12. A bistable circuit as defined in claim 11 in which the control coils are of a material to maintain superconductivity in the presence of their own magnetic fields.

References Cited in the file of this patent

UNITED STATES PATENTS

| | | |
|---|---|---|
| 1,825,855 | Craig | Oct. 6, 1931 |
| 1,948,209 | Fichandler | Feb. 20, 1934 |
| 2,666,884 | Ericsson et al. | Jan. 19, 1954 |
| 2,682,615 | Sziklai | June 29, 1954 |
| 2,832,897 | Buck | Apr. 29, 1958 |
| 2,852,732 | Weiss | Sept. 16, 1958 |